(12) United States Patent
May

(10) Patent No.: US 6,796,046 B1
(45) Date of Patent: Sep. 28, 2004

(54) MITER CUT, PLUMB CUT, AND SEAT CUT ANGLE FINDING SYSTEM

(76) Inventor: William Jeffrey May, 821 Estey Way, Placerville, CA (US) 95667

( * ) Notice: Subject to any disclaimer, the term of this patent is extended or adjusted under 35 U.S.C. 154(b) by 0 days.

(21) Appl. No.: 10/394,816

(22) Filed: Mar. 21, 2003

(51) Int. Cl.⁷ .................................................. B43L 7/10
(52) U.S. Cl. .............................. 33/404; 33/471; 33/473
(58) Field of Search ......................... 33/404, 451, 452, 33/464, 465, 471, 473

(56) References Cited

U.S. PATENT DOCUMENTS

| | | | | |
|---|---|---|---|---|
| 404,451 A | * | 6/1889 | Waggoner | 33/473 |
| 597,464 A | * | 1/1898 | Girton | 33/460 |
| 866,531 A | * | 9/1907 | Sollers | 33/465 |
| 946,472 A | * | 1/1910 | Stauffer | 33/343 |
| 1,095,149 A | * | 4/1914 | Hammer | 33/465 |
| 1,134,845 A | * | 4/1915 | Haga | 33/473 |
| 1,585,563 A | * | 5/1926 | Schlattau | 33/471 |
| 3,270,420 A | * | 9/1966 | Simril | 33/471 |
| 4,394,801 A | * | 7/1983 | Thibodeaux | 33/496 |
| 5,392,525 A | * | 2/1995 | Chow | 33/465 |
| 5,456,015 A | * | 10/1995 | Butcher et al. | 33/451 |
| 6,237,238 B1 | * | 5/2001 | Shapiro | 33/471 |
| 6,314,652 B1 | * | 11/2001 | English | 33/421 |
| 6,536,124 B1 | * | 3/2003 | Eskew et al. | 33/471 |

* cited by examiner

Primary Examiner—Christopher W. Fulton

(57) ABSTRACT

A miter cut, plumb cut, and seat cut angle finding system has a handle, a spacing block with a pair of attachment holes there through, a pair of coupling pins, a rotatable straight blade and a knurl ended coupling screw. The handle has a plurality of plates. Each plate has an upper pivoting portion end and a lower square end and two side edges there between, a pair of attachment holes there through and a screw hole, an arcuate viewing slot, and a plurality of indicia. The rotatable straight blade has a rectangular outer end and a semicircular arcuate inner end, an axially located central slot and an indica at top dead center of the semicircular arcuate end.

5 Claims, 7 Drawing Sheets

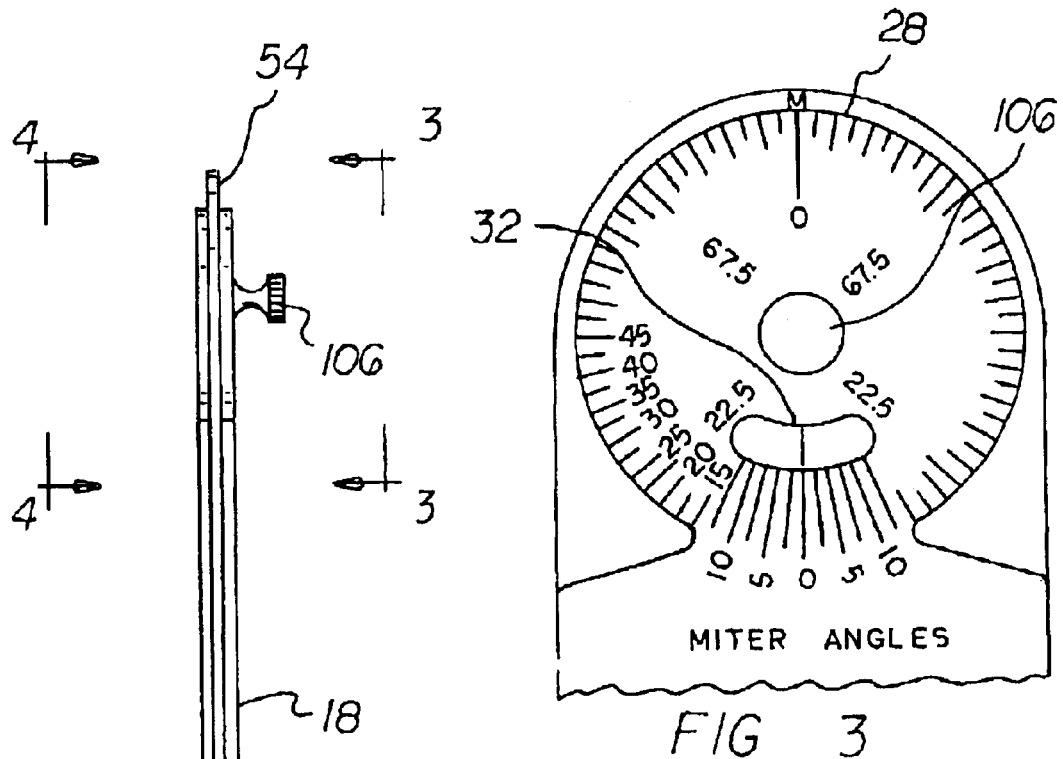
FIG 2
FIG 3
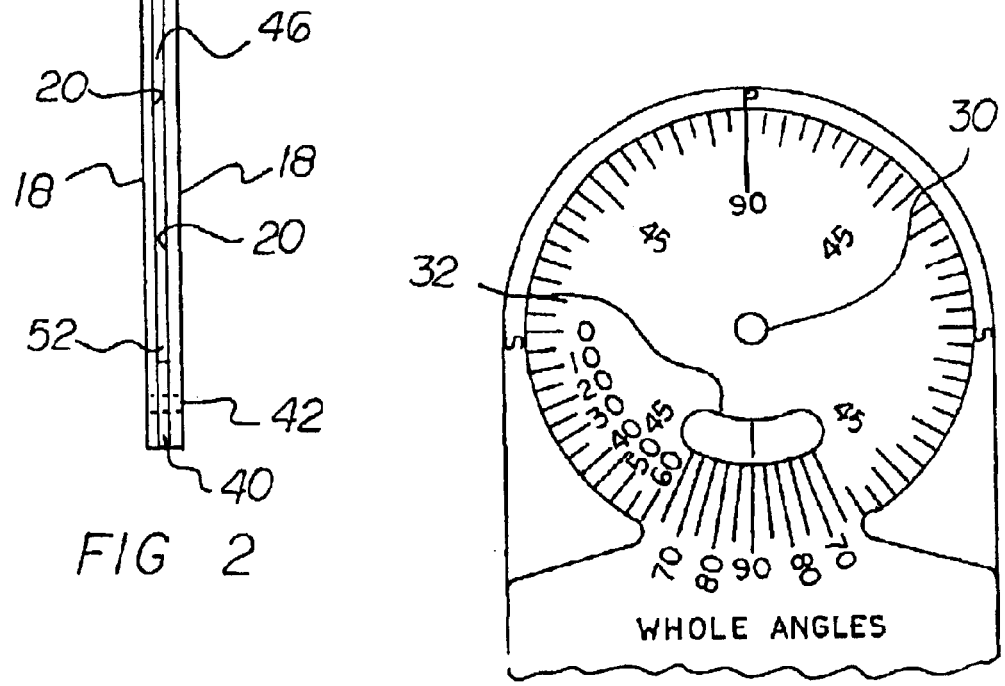
FIG 4

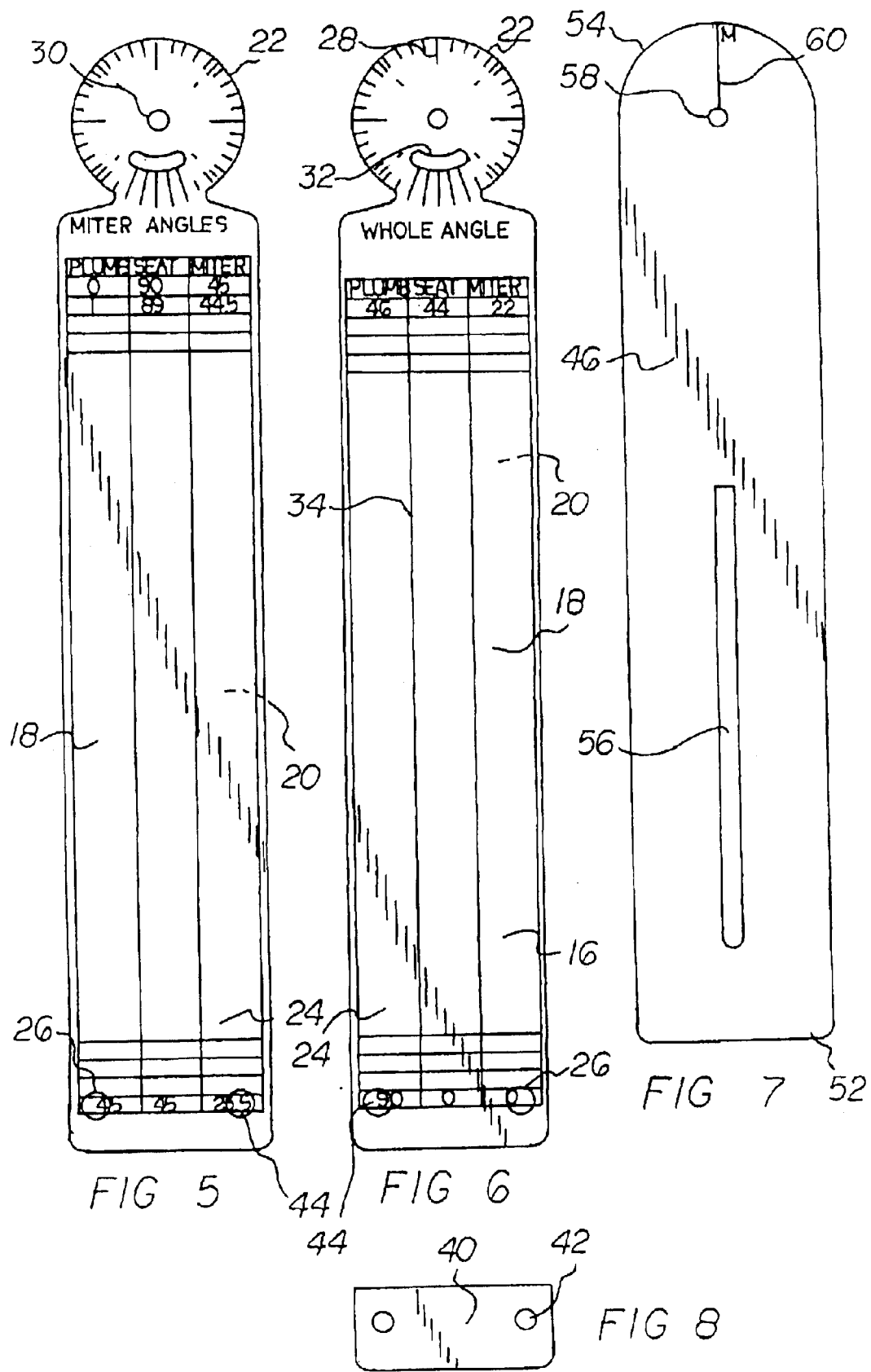

MITER CUT, PLUMB CUT, AND SEAT CUT ANGLE FINDING SYSTEM

BACKGROUND OF THE INVENTION

1. Field of the Invention

The present invention relates to a miter cut, plumb cut, and seat cut angle finding system and more particularly pertains to allowing a user to conveniently and efficiently determine an existing angle and determine a related angle.

2. Description of the Prior Art

The use of other known methods and apparatuses of expected and anticipated configurations is known in the prior art. More specifically, other known methods and apparatuses of expected and anticipated configurations previously devised and utilized for the purpose of allowing a user to determine an angle and a related angle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,374,504 to Graham discloses a rafter tool and method. U.S. Pat. No. 6,266,889 to Boyce discloses a device and method to define angles on a workpiece. U.S. Pat. No. 6,199,288 to Gregory discloses a tool for marking large flat building material sheets. U.S. Pat. No. 6,076,270 to Figliuzzi discloses an instant angle gauge. U.S. Pat. No. 5,918,439 to Metzer et al. discloses a roof shingle replacement tool and method. Finally, U.S. Pat. No. 5,758,428 to Kotlinski discloses a rafter measuring and positioning template and method.

While these devices fulfill their respective, particular objectives and requirements, the aforementioned patents do not describe a miter cut, plumb cut, and seat cut angle finding system that allows a user to conveniently and efficiently determine an existing angle and determine a related angle.

In this respect, the miter cut, plumb cut, and seat cut angle finding system according to the present invention substantially departs from the conventional concepts and designs of the prior art, and in doing so provides an apparatus primarily developed for the purpose of allowing a user to conveniently and efficiently determine an existing angle and determine a related angle.

Therefore, it can be appreciated that there exists a continuing need for a new and improved miter cut, plumb cut, and seat cut angle finding system which can be used for allowing a user to conveniently and efficiently determine an existing angle and determine a related angle. In this regard, the present invention substantially fulfills this need.

SUMMARY OF THE INVENTION

In view of the foregoing disadvantages inherent in the known types of other known methods and apparatuses of expected and anticipated configurations now present in the prior art, the present invention provides an improved a miter cut, plumb cut, and seat cut angle finding system. As such, the general purpose of the present invention, which will be described subsequently in greater detail, is to provide a new and improved miter cut, plumb cut, and seat cut angle finding system and method which has all the advantages of the prior art and none of the disadvantages.

To attain this, the present invention essentially comprises a miter cut, plumb cut, and seat cut angle finding system for allowing a user to conveniently and efficiently determine an existing angle and determine a related angle. The system comprises, in combination several components being a handle made of a plurality of plates, a removable straight blade and a coupling screw.

First provided is a handle that comprises a plurality of plates. The plates comprise a top plate and a bottom plate. Each plate is fabricated of rigid material and has a generally rectangular portion and a rounded pivoting portion. Each plate has an outer surface and an inner surface and a thickness there between. Each plate has an upper pivoting portion end and a lower square end portion and two side edges there between. Each plate has a first width and a first length with the diameter of the rounded pivoting portion being between about 7 and 15 percent smaller than the first width. Each lower square end portion has a pair of attachment holes of a first diameter there through. The pivoting portion of each plate has a plurality of indicia to allow the rapid determination of an angle and the requisite miter cut, seat cut, and compound cut. This allows a user to rapidly and accurately determine the necessary angle of a plumb, seat or miter cut. The pivoting portion has a central screw hole of a second diameter. The top plate has a smooth screw hole and the bottom plate has a threaded screw hole to allow the coupling of the two plates with a coupling screw. Each plate has a mutually aligned arcuate viewing slot of the second diameter located between the central screw hole and the rectangular portion of the handle. The viewing slot allows a user to view the blade indicia as it aligns with the indicia of the pivoting portion. The outer surface of each plate has a plurality of indicia for cross referencing an angle and a desired miter cut and a desired seat cut. The indicia provide a set of three angles, being the plumb cut, seat cut, and miter cut, for each degree between 0 degrees and 90 degrees.

Next provided is a spacing block fabricated of a rigid material. The block has a first width and a second length. The second length is between about 7 and 12 percent of the first length. The spacing block has a pair of attachment holes of the first diameter there through. The holes are sized to match and mate with the attachment holes of the handle plates.

Next provided is a pair of coupling pins of the first diameter. The pins are each sized to be mated to and securely held within each of the attachment holes of the spacer and the handle plates. The pins may be press fit and therefore may be a few thousandths of an inch in diameter less than the holes of the handle plates.

Next provided is an interchangeable rotatable straight blade. The blade is fabricated of a rigid material and has a first width and a third length. The third length is the equivalent of the difference of the second length of the spacer subtracted from and the first length of the handle. The blade has a front face and a back face and a thickness there between. The blade has a rectangular outer end and a semicircular arcuate inner end. The diameter of the arcuate end is equal to the first width. The outer end has an axially located central slot with rounded slot ends of the second diameter. The inner end has a centrally located screw hole of the second diameter. The inner end has a radial single indicia line inscribed with an "M" at top dead center of the semicircular arcuate end to indicate the preferred miter cut. When the user employs the system, he can view the single indicia through the arcuate slot of the pivotal portion of the handle.

Lastly provided is a knurl ended coupling screw. The screw has the second diameter and is sized to mate with and couple the handle plates and the straight blade. The screw allows a user to loosen and tighten the system as desired. This allows the pivoting of the blade through a complete circle about the coupling screw.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved miter cut, plumb cut, and seat cut angle finding system which has all of the advantages of the prior art other known methods and apparatuses of expected and anticipated configurations and none of the disadvantages.

It is another object of the present invention to provide a new and improved miter cut, plumb cut, and seat cut angle finding system which may be easily and efficiently manufactured and marketed.

It is further object of the present invention to provide a new and improved miter cut, plumb cut, and seat cut angle finding system which is of durable and reliable constructions.

An even further object of the present invention is to provide a new and improved miter cut, plumb cut, and seat cut angle finding system which is susceptible of a low cost of manufacture with regard to both materials and labor, and which accordingly is then susceptible of low prices of sale to the consuming public, thereby making such miter cut, plumb cut, and seat cut angle finding system economically available to the buying public.

Even still another object of the present invention is to provide a miter cut, plumb cut, and seat cut angle finding system for allowing a user to conveniently and efficiently determine an existing angle and determine a related angle.

Lastly, it is an object of the present invention to provide a new and improved miter cut, plumb cut, and seat cut angle finding system. The system comprises in combination several components. The components are a handle, a spacing block with a pair of attachment holes there through, a pair of coupling pins, a rotatable straight blade and a knurl ended coupling screw. The handle has a plurality of plates. Each plate has an upper pivoting portion end and a lower square end and two side edges there between, a pair of attachment holes there through and a screw hole, an arcuate viewing slot, and a plurality of indicia. The rotatable straight blade has a rectangular outer end and a semicircular arcuate inner end, an axially located central slot and an indica at top dead center of the semicircular arcuate end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the system taken along line 2—2 of FIG. 1.

FIGS. 3 and 4 are enlarged views of the front and back of the upper portion of the invention.

FIGS. 5, 6, 7 and 8 are views of the various parts which make up the invention.

The same reference numerals refer to the same parts throughout the various Figures.

DESCRIPTION OF THE PREFERRED EMBODIMENT

Figure 1:
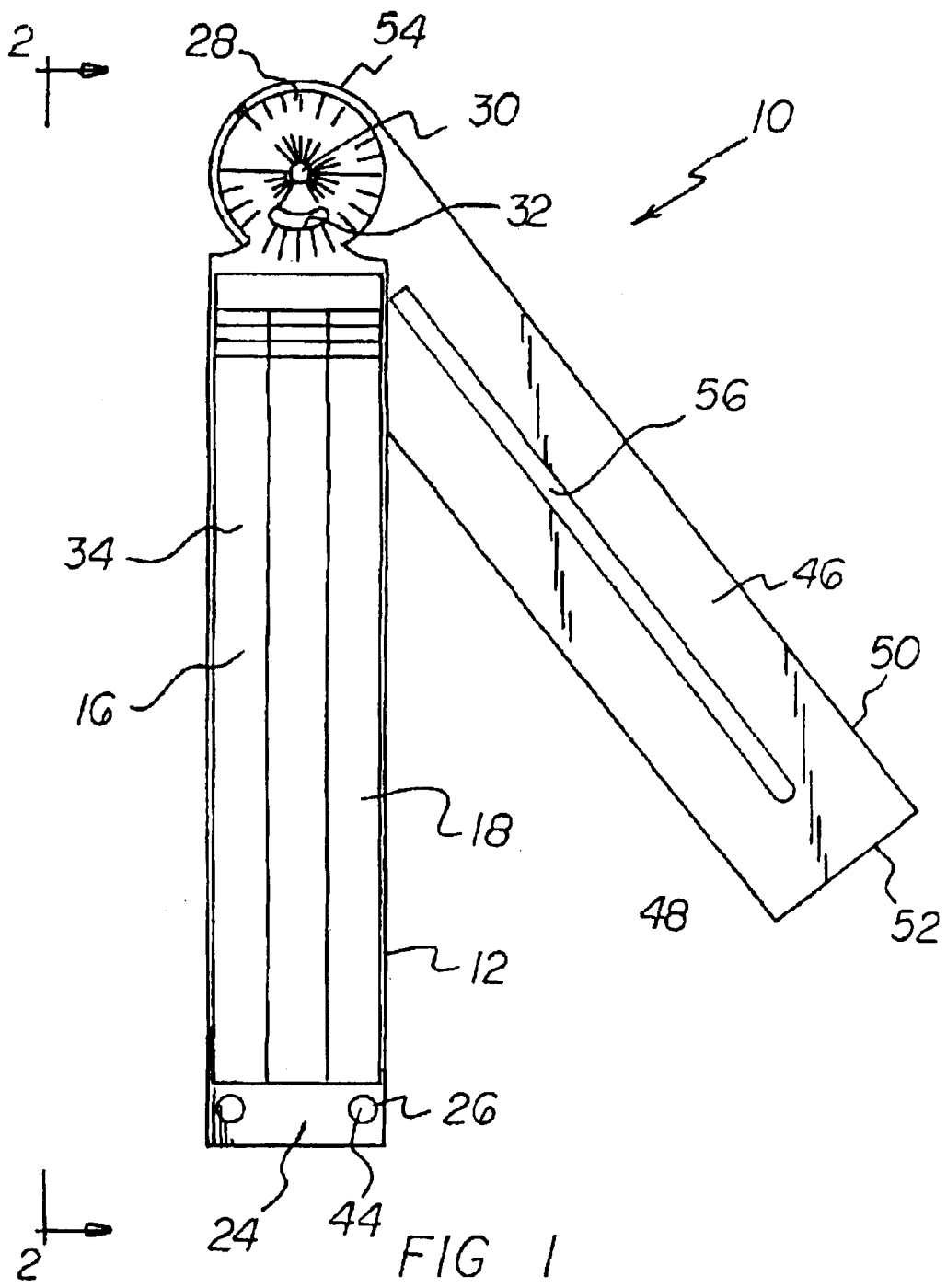
FIG. 1 is a front elevational view of the miter cut, plumb cut, and seat cut angle finding system constructed in accordance with the principles of the present invention.
Figure 9:
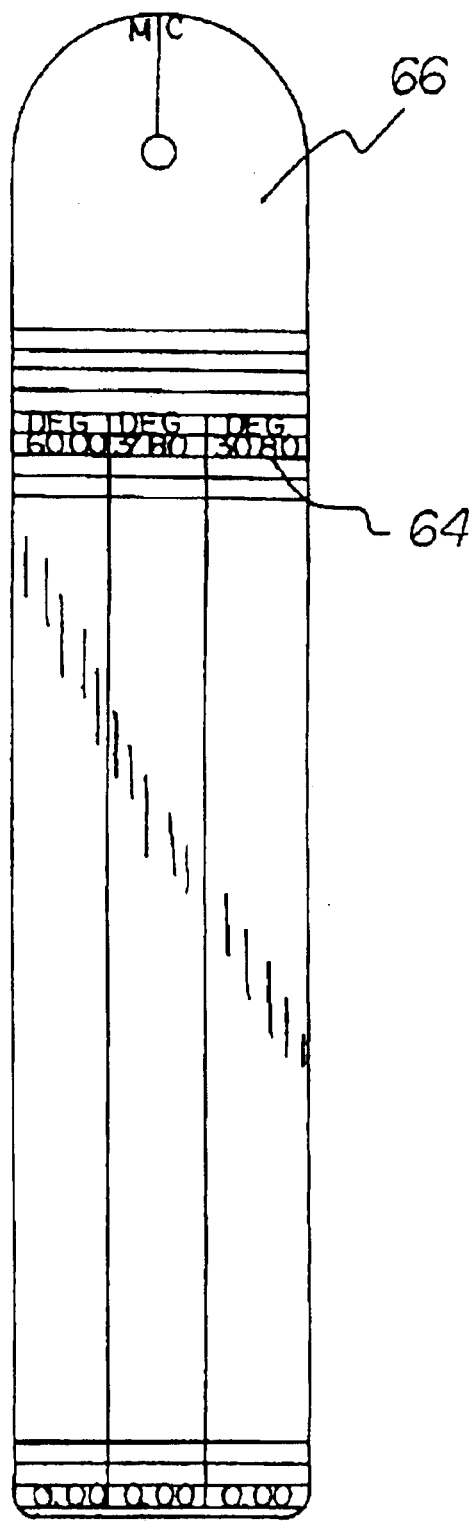
FIGS. 9 and 10 are front and back views, similar to FIG. 7, of an alternate embodiment.
Figure 10:
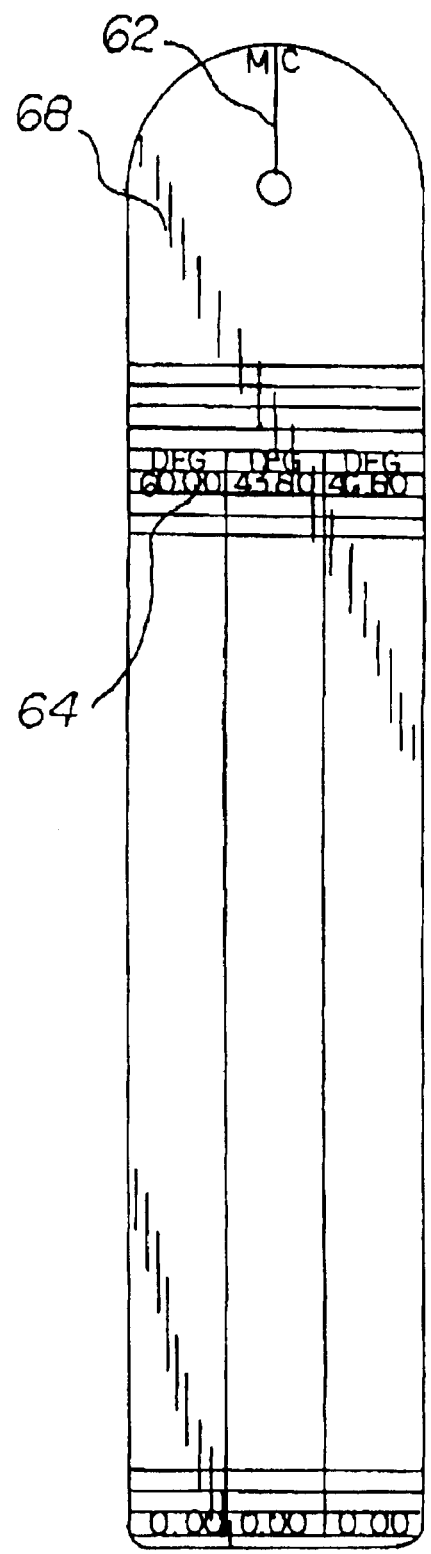
Figure 11:
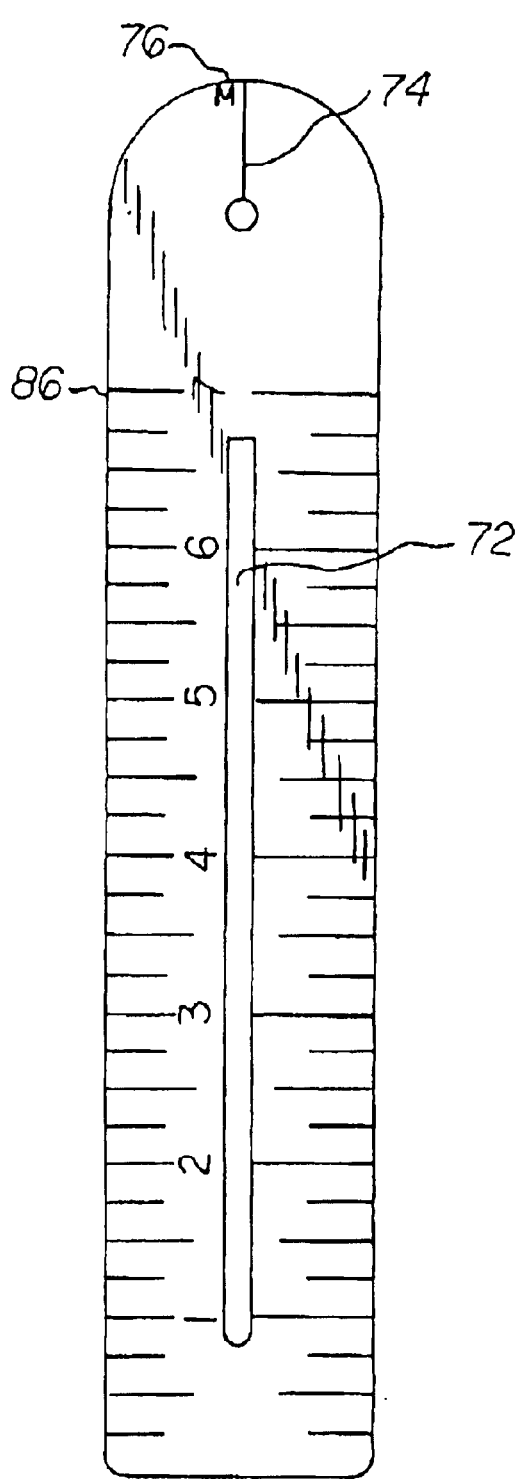
FIGS. 11 and 12 are front and back views of an additional alternate embodiment of the invention similar to FIG. 7.
Figure 12:
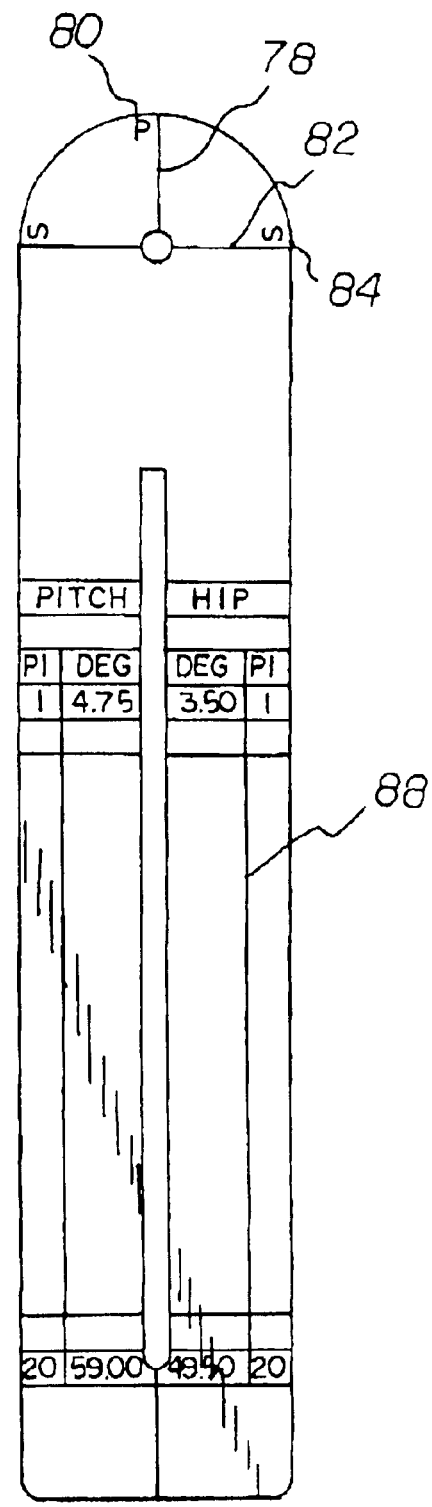
Figure 13:
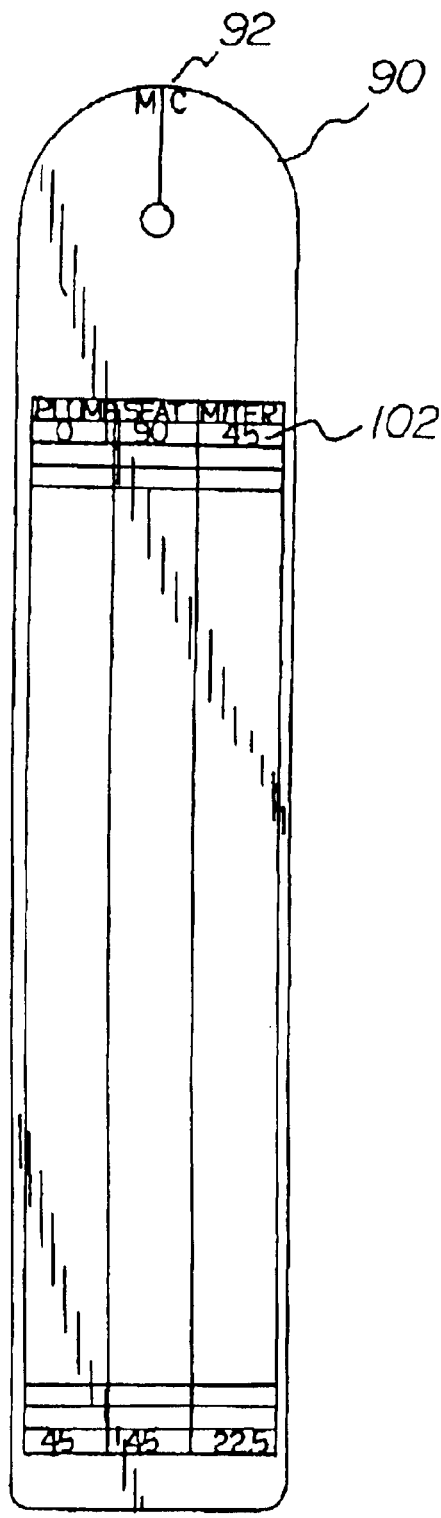
FIGS. 13 and 14 are front and back views of an additional alternate embodiment of the invention similar to FIG. 7.
Figure 14:
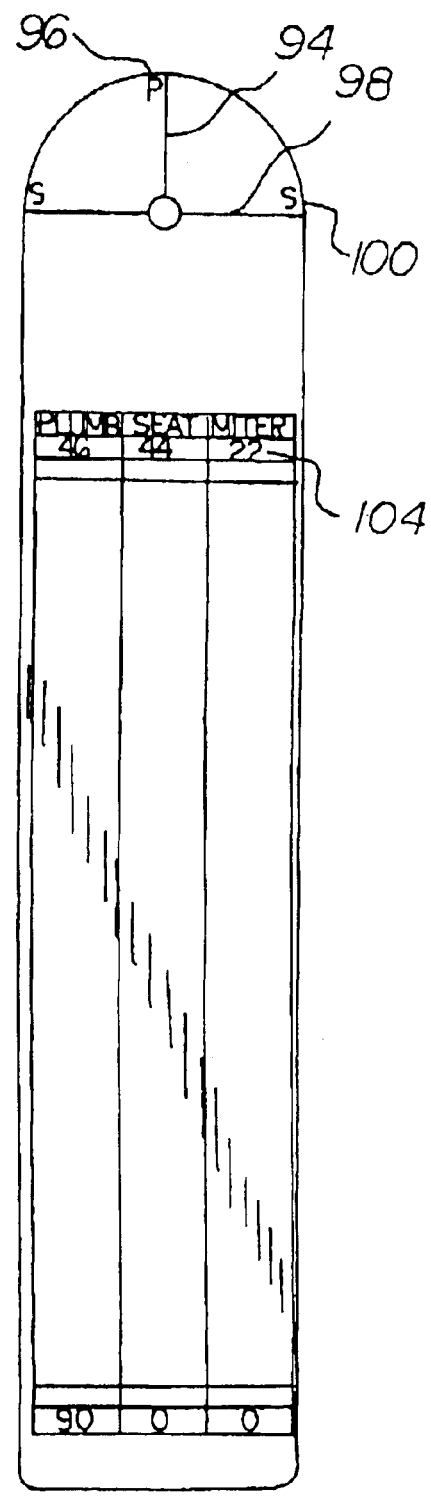
Figure 15:
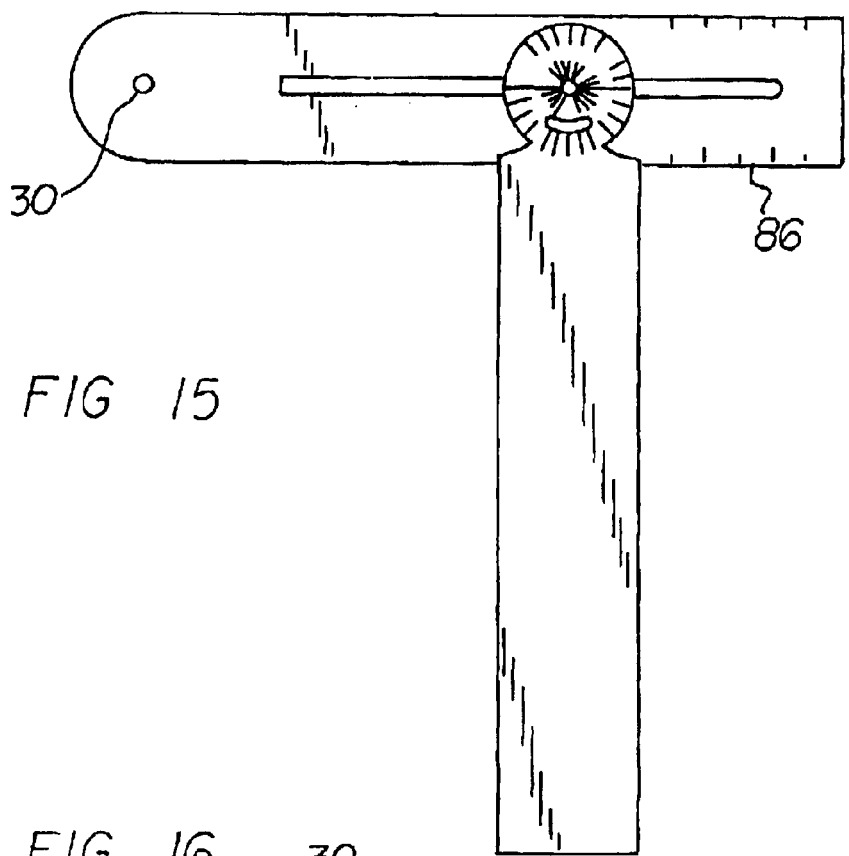
FIG. 15 is a alternate embodiment of the invention without indicia.
Figure 16:
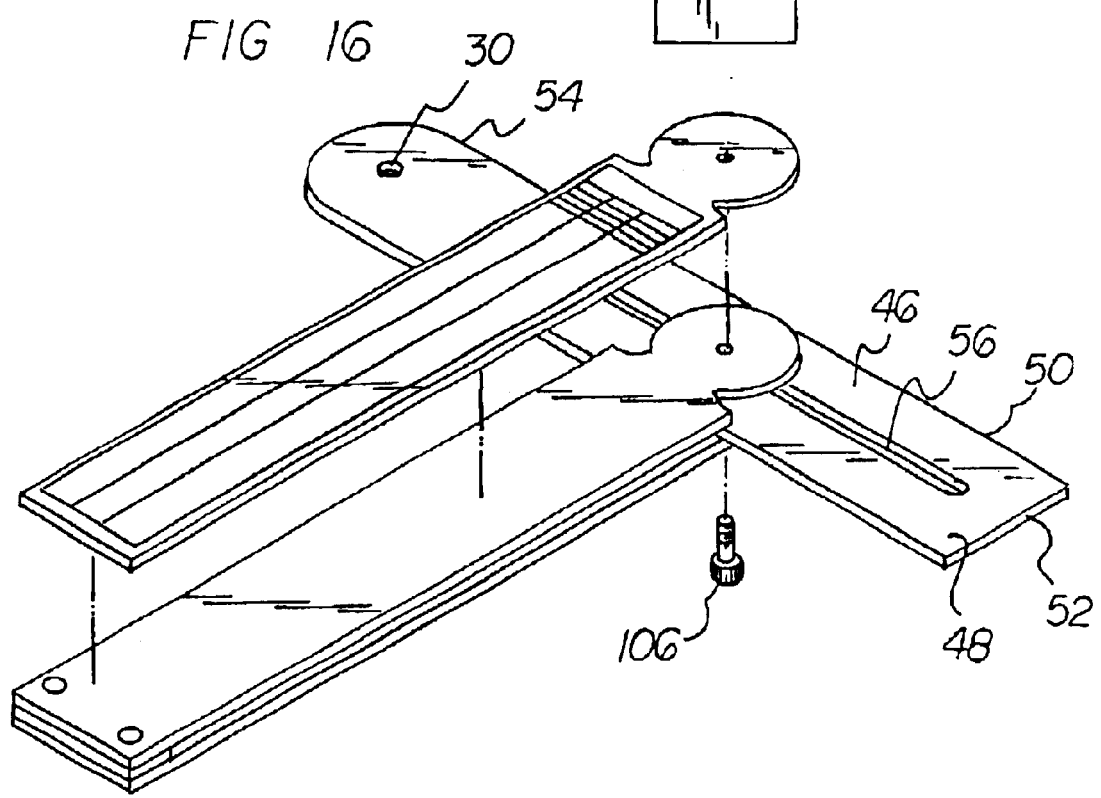
FIG. 16 is a perspective embodiment of additional embodiment with attachable indicia plates.

With reference now to the drawings, and in particular to FIG. 1 thereof, the preferred embodiment of the new and improved miter cut, plumb cut, and seat cut angle finding system embodying the principles and concepts of the present invention and generally designated by the reference numeral 10 will be described.

The present invention, a miter cut, plumb cut, and seat cut angle finding system 10 is comprised of a plurality of components. Such components in their broadest context include a handle comprised of a plurality of plates, a interchangeable blade, a spacer and a knurled coupling screw. Such components are individually configured and correlated with respect to each other so as to attain the desired objective.

A miter cut, plumb cut, and seat cut angle finding system 10 for allowing a user to conveniently and efficiently determine an existing angle and determine a related angle.

First provided is a handle 12 that comprises a plurality of plates. The plates comprise a top plate 14 and a bottom plate 16. Each plate is fabricated of rigid material and has a generally rectangular portion and a rounded pivoting portion. Each plate has an outer surface 18 and an inner surface 20 and a thickness there between. Each plate has an upper pivoting portion end 22 and a lower square end portion 24 and two side edges there between.

Each plate has a first width and a first length with the diameter of the rounded pivoting portion being between about 7 and 15 percent smaller than the first width. Each lower square end portion has a pair of attachment holes 26 of a first diameter there through. The pivoting portion of each plate has a plurality of indicia 28 to allow the rapid determination of an angle and the requisite miter cut, seat cut, and plumb cut. This allows a user to rapidly and accurately determine the necessary angle of a plumb, seat or miter cut.

The pivoting portion has a central screw hole 30 of a second diameter. The top plate has a smooth screw hole and the bottom plate has a threaded screw hole to allow the coupling of the two plates with a coupling screw. Each plate has a mutually aligned arcuate viewing slot 32 of the second diameter located between the central screw hole and the rectangular portion of the handle. The viewing slot allows a user to view the blade indicia as it aligns with the indicia of the pivoting portion.

The outer surface of each plate has a plurality of indicia 34 for cross referencing an angle and a desired miter cut and a desired seat cut. The indicia provide a set of three angles, being the plumb cut, seat cut, and miter cut, for each degree between 0 degrees and 90 degrees.

Next provided is a spacing block 40 fabricated of a rigid material. The block has a first width and a second length. The second length is between about 7 and 12 percent of the first length. The spacing block has a pair of attachment holes 42 of the first diameter there through. The holes are sized to match and mate with the attachment holes of the handle plates.

Next provided is a pair of coupling pins 44 of the first diameter. The pins are each sized to be mated to and securely held within each of the attachment holes of the spacer and the handle plates. The pins may be press fit and therefore may be a few thousandths of an inch in diameter less than the holes of the handle plates. Next provided is an interchangeable rotatable straight blade 46. The blade is fabricated of a rigid material and has a first width and a third length. The third length is the equivalent of the difference of the second length of the spacer subtracted from and the first length of the handle. The blade has a front face 48 and a back face 50 and a thickness there between. The blade has a rectangular outer end 52 and a semicircular arcuate inner end 54. The diameter of the arcuate end is equal to the first width. The outer end has an axially located central slot 56 with rounded slot ends of the second diameter. The inner end has a centrally located screw hole 58 of the second diameter.

The inner end has a radial single indicia line 60 inscribed with an "M" at top dead center of the semicircular arcuate end to indicate the preferred miter cut. When the user employs the system, he can view the single indicia through the arcuate slot of the pivotal portion of the handle.

In an alternative embodiment the blade is interchangeable with a plurality of blades. Each blade having a different indicia and physical configuration. One alternative may comprise the inner end of the blade having a radial single indicia line at top dead center of the semicircular arcuate end marked "MC" 62 to indicate the miter crown cut. The blade has indicia 64 inscribed on the front face 66 and the back face 68. Each face having indicia setting forth an angle to make a required compound miter cut for crown molding.

Another embodiment comprises a blade having an axial central slot 72. The inner end of the front face of the blade has a radial single indicia line 74 at top dead center of the semicircular arcuate end marked "M" 76 to indicate the desired miter cut. The inner end of the back face has a radial single indicia line 78 at top dead center marked "P" 80 to indicate the desired plumb angle. The back face of the blade has an additional indicia line 82 perpendicular to the top dead center line of the semicircular arcuate end marked "S" 84 to indicate the desired seat angle cut. The front face of the blade has measuring indicia 86 and the back face of the blade has indicia 88 indicating pitch and plumb angles commonly used for roof construction.

Another embodiment of the blade is a blade with the inner end of the front face having a radial single indica line 90 at top dead center of the semicircular arcuate end marked "MC" 92 to indicate the desired miter cut. The inner end of the back face has a radial single indicia line 94 at top dead center marked "P" 96 to indicate the desired plumb cut for an angle. The back face also has an indicia line 98 perpendicular to the top dead center line of the semicircular arcuate end marked "S" 100 to indicate the desired seat angle cut. The front face of the blade has indicia 102 indicating plumb and seat and miter angles, and the back face of the blade has indicia 104 indicating plumb and seat and miter angles.

Lastly provided is a knurl ended coupling screw 106. The screw has the second diameter and is sized to mate with and couple the handle plates and the straight blade. The screw allows a user to loosen and tighten the system as desired. This allows the pivoting of the blade through a complete circle about the coupling screw.

The system as described replaces several tools which are currently used. The system makes the determination of an angle, either inside or outside, a matter of aligning the tool and reading the angle. In addition, the indicia of the tool as well as the indicia on the blade, make the determination of the angle of a complimenting miter, seat or plumb cut a matter of simply reading the indicia on the system. Under the existing art, a user must make calculations, which may be subject to arithmetic errors, and hence, introduce inaccuracy into the outcome.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be resent invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, fallings within the scope of the invention.

What is claimed is:

1. A miter cut, plumb cut, and seat cut angle finding system for allowing a user to conveniently and efficiently determine an existing angle and determine a related angle, comprising in combination:

a handle comprising a plurality of plates being a top plate and a bottom plate, with each plate fabricated of rigid material and having a generally rectangular portion and a rounded pivoting portion, with each plate having an outer surface and an inner surface and a thickness there between, and each plate having a lower square end and two side edges there between, each plate having a first width and a first length with the diameter of the rounded pivoting portion being between about 7 and 15 percent smaller than the first width, with each lower square end portion having a pair of attachment holes of a first diameter there through, the pivoting portion of each plate having a plurality of indicia to allow the rapid determination of an angle and the requisite miter and seat cut and compound cut, the pivoting portion having a central screw hole of a second diameter with the top plate having a smooth screw hole and the bottom plate having a threaded screw hole, with each plate having a mutually aligned arcuate viewing slot of the second diameter located between the central screw hole and the rectangular portion, the outer surface of each plate having a plurality of indicia for cross referencing an angle and a desired miter cut and a desired seat cut;

a spacing block fabricated of rigid material and having the first width and a second length, the second length being between about 7 and 12 percent of the first length, with the spacing block having a pair of attachment holes of the first diameter there through sized to match and mate with the attachment holes of the handle plates;

a pair of coupling pins of the first diameter sized to be mated to and securely held within the attachment holes of the spacer and the handle plates;

an interchangeable rotatable straight blade fabricated of rigid material having the first width and a third length, the third length being the equivalent of the difference of the second length of the spacer subtracted from and the first length of the handle, the blade having a front face and a back face and a thickness there between with a rectangular outer end and a semicircular arcuate inner end with the diameter of the arcuate end being equal to the first width, the outer end having an axially located central slot with rounded slot ends of the second diameter, with the inner end having a centrally located screw hole of the second diameter, the inner end having a radial single indica line inscribed with an "M" at top dead center of the semicircular arcuate end to indicate the preferred miter cut; and a knurl ended coupling screw of the second diameter sized to mate with and couple the handle and straight blade and to allow loosening and tightening as desired by the user for allowing the pivoting of the blade through a complete circle about the coupling screw.

2. A miter cut, plumb cut, and seat cut angle finding system, comprising in combination:

a handle comprising a plurality of plates with each plate having an upper pivoting portion end and a lower square end and two side edges there between, with each plate having a screw hole with a central axis, with each plate having an arcuate viewing slot with the slots in an aligned orientation and curved with their centers of curvature the axis of the screw hole and with each plate having a plurality of indicia;

a spacing block between the plates at the lower square end;

a mechanism for coupling the plates and the block;

a rotatable straight blade with a front face and a back face and having a rectangular outer end and a semicircular arcuate inner end with an axially located central slot and an indica at top dead center of the semicircular arcuate end, the indicia also including indicia on each face adapted to be viewed through the viewing slots; and a knurl ended coupling screw.

3. A miter cut, plumb cut, and seat cut angle finding system as set forth in claim 2 wherein the system further comprises an interchangeable rotatable straight blade fabricated of rigid material having a first width and a first length wherein the blade has a thickness between the faces with a rectangular outer end and a semicircular arcuate inner end with the diameter of the arcuate end being equal to the first width, with the inner end having a centrally located screw hole of the second diameter, the inner end having a radial single indicia line at top dead center of the semicircular arcuate end marked "MC" to indicate the miter crown cut, with the front face and the back face each having indicia setting forth an angle and a required crown and required miter cut.

4. A miter cut, plumb cut, and seat cut angle finding system as set forth in claim 2 wherein the system further comprises an interchangeable rotatable straight blade fabricated of rigid material having a first width and a first length, the blade having a front face and a back face and a thickness there between with a rectangular outer end and a semicircular arcuate inner end with the diameter of the arcuate end being equal to the first width, the outer end having an axially located central slot with rounded slot ends of the second diameter, with the inner end having a centrally located screw hole of the second diameter, the inner end of the front face having a radial single indica line at top dead center of the semicircular arcuate end marked "M" to indicate the desired miter cut and the inner end of the back face having a radial single indicia line at top dead center marked "P" to indicate the desired plumb angle, and an indicia line perpendicular to the top dead center line of the semicircular arcuate end marked "S" to indicate the desired seat angle cut, with the front face of the blade having measuring indicia and the back face of the blade having indicia indicating pitch and plumb angles commonly used for roof construction.

5. A miter cut, plumb cut, and seat cut angle finding system as set forth in claim 2 wherein the system further comprises an interchangeable rotatable straight blade fabricated of rigid material having a first width and a first length, the blade having a front face and a back face and a thickness there between with a rectangular outer end and a semicircular arcuate inner end with the diameter of the arcuate end being equal to the first width, with the inner end having a centrally located screw hole of the second diameter, the inner end of the front face having a radial single indica line at top dead center of the semicircular arcuate end marked "MC" to indicate the desired miter cut and the inner end of the back face having a radial single indicia line at top dead center marked "P" to indicate the desired plumb cut for an angle, and an indicia line perpendicular to the top dead center line of the semicircular arcuate end marked "S" to indicate the desired seat angle cut, with the front face of the blade having indicia indicating plumb and seat and miter angles, and the back face of the blade having indicia indicating plumb and seat and miter angles.

* * * * *